United States Patent [19]

Richardson

[11] Patent Number: 5,009,570
[45] Date of Patent: Apr. 23, 1991

[54] MOUNTING ASSEMBLY FOR THE IMPELLER OF A FLUID PUMP

[75] Inventor: Curtis G. Richardson, Energy, Ill.

[73] Assignee: Maytag Corporation, Newton, Iowa

[21] Appl. No.: 346,584

[22] Filed: May 2, 1989

[51] Int. Cl.⁵ .............................................. F04D 29/10
[52] U.S. Cl. ............................ 415/174.2; 416/204 R; 277/88; 403/146; 403/259; 403/356; 403/359
[58] Field of Search ............... 415/170.1, 174.1, 174.2, 415/174.3; 416/204 R, 204 A, 206, 207, 209; 277/88, 81 R; 403/259, 260, 261, 356, 359, 365, 146, 147; 417/424.1, 423.11; 68/23.7, 133

[56] References Cited

U.S. PATENT DOCUMENTS

| 1,880,911 | 10/1932 | Durdin, Jr. | 415/174.2 |
| 2,118,681 | 5/1938 | Macdonald | 415/174.3 |
| 2,227,304 | 12/1940 | Geyer | 277/93 R |
| 2,688,930 | 9/1954 | De Moss | 415/141 |
| 2,733,682 | 5/1956 | Langteau | 415/118 |
| 2,743,673 | 2/1956 | Kaatz et al. | 417/423.12 |
| 2,807,395 | 9/1957 | Korte | 222/333 |
| 2,867,173 | 1/1959 | Lung | 417/360 |
| 3,307,485 | 3/1967 | Logue | 415/174.2 |
| 3,366,068 | 1/1968 | Rye | 415/174.3 |
| 3,367,274 | 2/1968 | Lombard | 415/174.2 |
| 3,457,870 | 7/1969 | Sleeter | 415/174.3 |
| 3,474,733 | 10/1969 | Saletzki et al. | 415/174.3 |
| 3,664,760 | 5/1972 | Reiner | 417/423.11 |
| 3,702,745 | 11/1972 | Segebrecht | 415/174.2 |
| 3,814,086 | 6/1974 | Lemb | 128/66 |
| 4,306,841 | 12/1981 | Morrison et al. | 417/360 |
| 4,437,325 | 3/1984 | Hershberger | 68/23.7 |
| 4,548,547 | 10/1985 | Deuring | 277/88 |
| 4,695,183 | 9/1987 | Greenberg | 403/259 |
| 4,803,855 | 2/1989 | Kennedy | 68/23.7 |

FOREIGN PATENT DOCUMENTS 1810943 5/1970 Fed. Rep. of Germany ... 415/174.3
1372791 11/1974 United Kingdom .

Primary Examiner—John T. Kwon
Attorney, Agent, or Firm—Bacon & Thomas

[57] ABSTRACT

The impeller of a fluid pump contained within an impeller housing is axially located on the drive shaft of a motor by securing the impeller to a sleeve that is slidably keyed onto the end of a motor shaft with a seal spring disposed between the sleeve and impeller housing urging the sleeve and impeller against the drive shaft so that the end thrust force is provided by the motor shaft bearings.

16 Claims, 2 Drawing Sheets

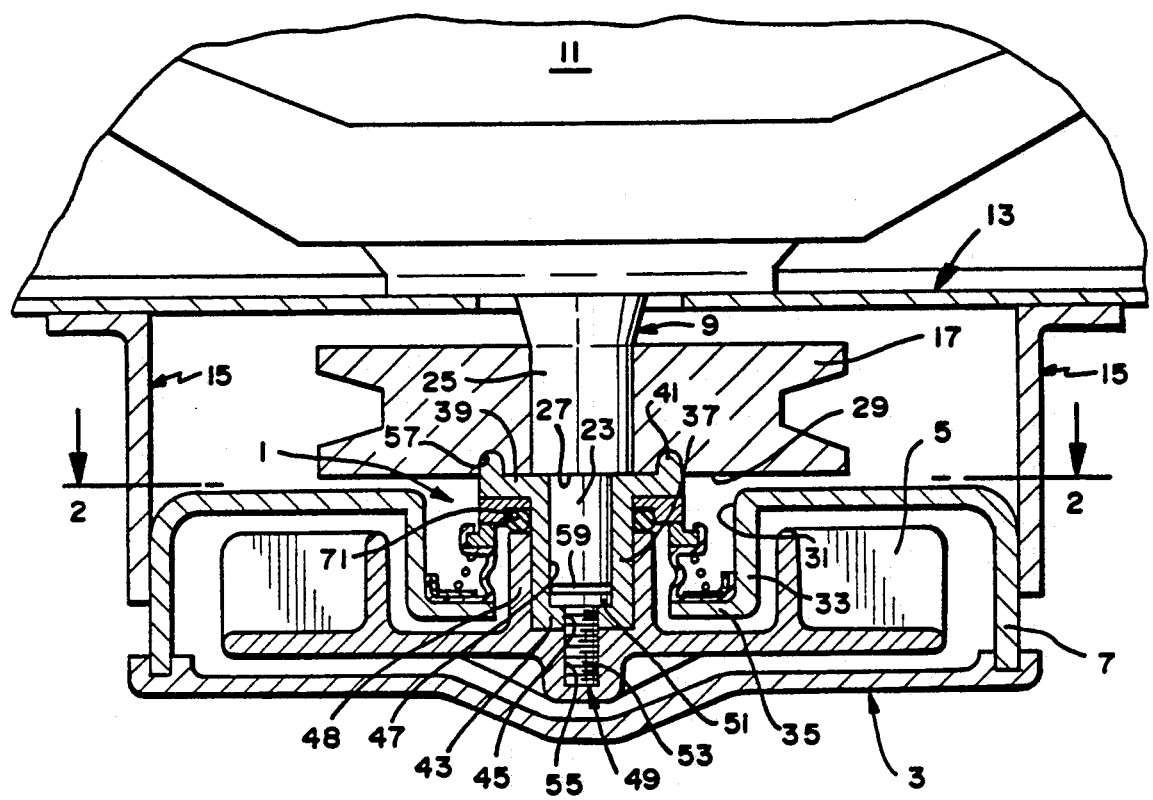
FIG_1
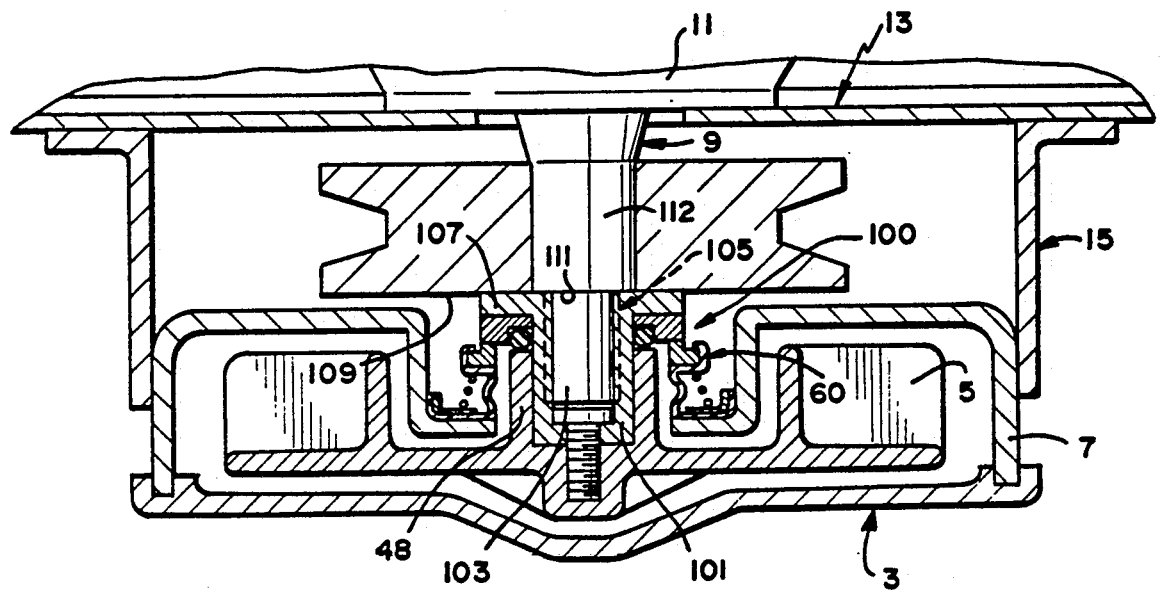
FIG_4

MOUNTING ASSEMBLY FOR THE IMPELLER OF A FLUID PUMP

BACKGROUND OF THE INVENTION

1. Field of the Invention

The present invention generally involves the field of technology pertaining to fluid pumps. More specifically, the invention relates to an improved assembly for mounting the impeller of a fluid pump to the drive shaft of an electric motor in an automatic clothes washing machine.

2. Background of the Invention

A conventional automatic clothes washing machine is provided with a pump driven by an electric motor for directing fresh water into the clothes tub and removing spent water therefrom during a programmed sequence of washing, rinsing and spin drying cycles. The pump includes a rotary impeller contained within a housing having inlet and outlet ports. The impeller is directly driven by the drive shaft of the motor and an annular fluid seal is provided between the impeller housing and drive shaft to prevent leakage of water from the housing. The seal structure and manner in which the impeller is axially located with respect to the drive shaft comprise the basic features of an assembly for mounting the pump to the drive shaft. The configuration of this assembly affects the manufacturing cost, longevity and maintenance requirements of the pump.

It is known to directly attach the pump impeller to the drive shaft of the motor. This approach requires extending the hub of the impeller through the back of the pump and providing an appropriate means for attaching the hub to the drive shaft. In order to gain reasonable access to this attachment for maintenance purposes, the pump must be spaced a suitable distance from the motor, thus consuming additional axial space and requiring more material in forming the impeller housing and a longer drive shaft. A mounting assembly of this type also requires manipulation of the attachment between the impeller hub and drive shaft during installation and removal of the pump with respect to the motor.

It is also known to attach a pump impeller to a motor drive shaft by utilizing a bearing in the form of a "thrust button" for providing the end thrust required to axially locate the impeller on the drive shaft, with the thrust force being imposed by an appropriate clamp structure. A spring in the fluid seal of this assembly urges the impeller in a axial direction away from the drive shaft. This approach requires the additional cost of the thrust button.

SUMMARY OF THE INVENTION

It is an object of the invention to provide an improved assembly for mounting a fluid pump to the drive shaft of an electric motor.

It is another object of the invention to provide an improved assembly for axially locating and maintaining the impeller of an automatic washing machine pump on the drive shaft of an electric motor.

It is a further object of the invention to provide an improved assembly for mounting the impeller of a fluid pump on the drive shaft of an electric motor by utilizing the spring force of the pump seal to provide axial location of the impeller on the drive shaft so that the shaft bearings of the motor provide the end thrust to the impeller.

It is still another object of the invention to provide a mounting assembly for a fluid pump that is simple in construction, economical to manufacture and facilitates the installation and removal of the pump with respect to an electric motor.

These and other objects of the invention are realized by providing a mounting assembly comprising a sleeve which is freely and slidably keyed onto the end of a motor drive shaft for rotation therewith. The impeller of the pump is attached to the sleeve for rotation by the drive shaft. A spring-biased sealing assembly is disposed between the sleeve and impeller housing for providing the required end thrust to axially locate the impeller on the drive shaft without requiring the presence of a thrust bearing or attachment of the impeller to the drive shaft. The sealing assembly preferably includes a ceramic counter ring in engagement with the sleeve and a plastic slide ring secured to an elastic boot containing a spring for urging corresponding faces of the two rings together to define a seal therebetween. The sleeve may be keyed against rotation on the drive shaft by providing a plurality of axially extending studs on a lateral flange thereof for engagement in corresponding recesses provided in a face of a drive pulley mounted on the drive shaft or by providing a splined engagement between the interior wall of the sleeve and the exterior wall of the drive shaft.

Other objects, features and advantages of the invention shall become apparent from the following detailed description of preferred embodiments thereof, when considered in conjunction with the drawings wherein like reference characters refer to corresponding parts in the several views.

BRIEF DESCRIPTION OF THE DRAWINGS

FIG. 1 is a cross-sectional view showing a mounting assembly according to a first embodiment of the invention for axially locating and maintaining the impeller of a fluid pump on the drive shaft of an electric motor.

FIG. 4 is a cross-sectional view showing a mounting assembly according to a second embodiment of the invention.

DETAILED DESCRIPTION OF THE PREFERRED EMBODIMENTS

Figure 2:
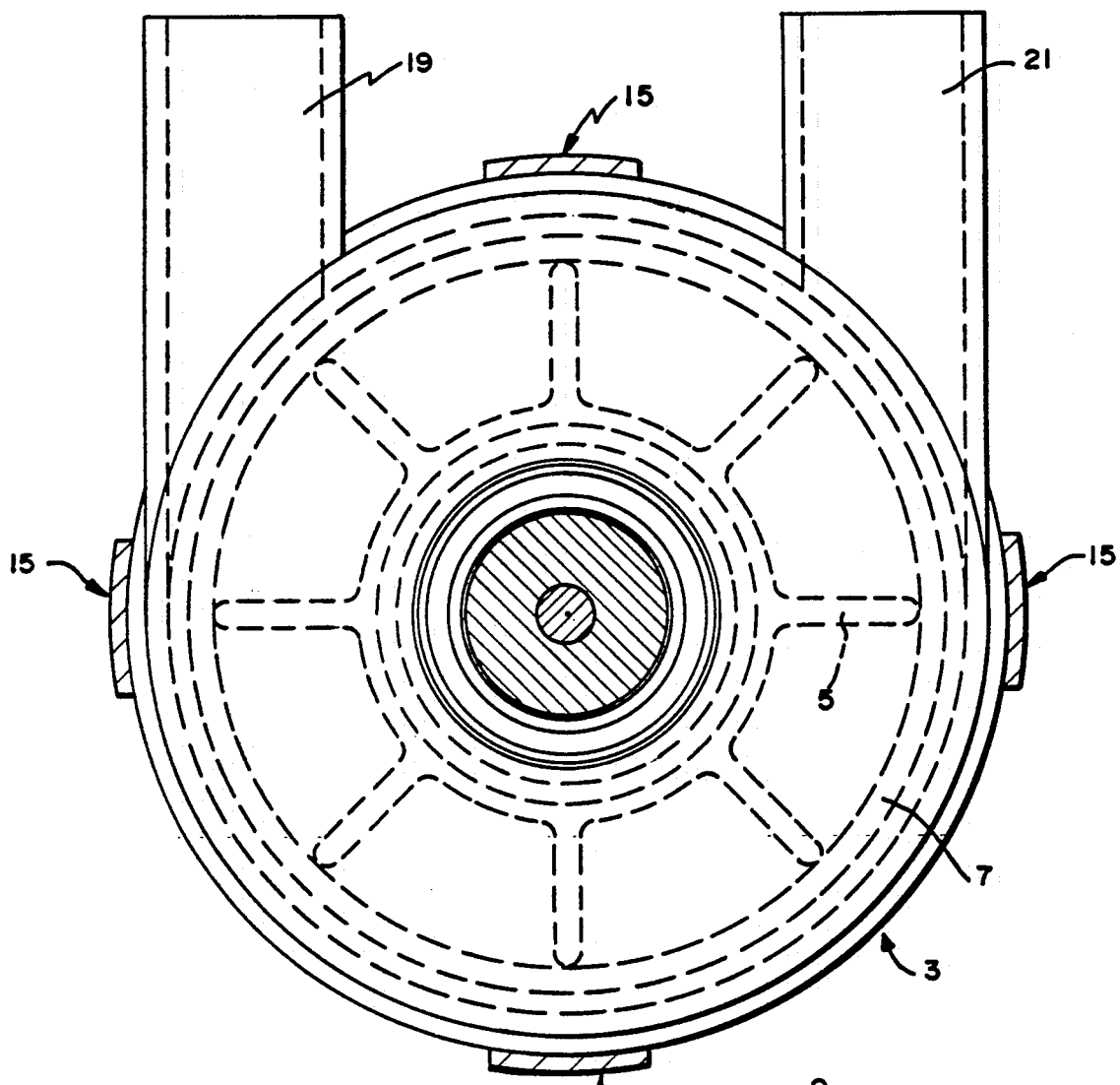
FIG. 2 is a cross-sectional view taken along the line 2—2 of FIG. 1 and particularly showing the impeller housing, inlet and outlet of the pump.

A mounting assembly 1, according to a first preferred embodiment of the invention shall be described with initial reference to FIGS. 1 and 2. As shown therein, a fluid pump 3 includes an impeller 5 disposed within a housing 7. Impeller 5 is driven by a drive shaft 9 of an electric motor, shown generally at 11. A support frame 13 is provided for mounting motor 11, and housing 7 of pump 3 may be rigidly secured to frame 13 by a plurality of spaced mounting legs, shown generally at 15, in a conventional manner.

In a preferred environment of use for assembly 1, motor 11 may form a part of an automatic clothes washing machine and drive shaft 9 may be provided with a drive pulley 17 mounted thereon for driving an appropriate belt and associated transmission to operate the washing, rinsing and spin-drying cycles of the machine. As seen in FIG. 2, pump 3 further includes a fluid inlet 19 and a fluid outlet 21 so that pump 3 may provide fresh water to the machine and remove spent water therefrom through pressurization of the water by impeller 5.

As also shown in FIG. 1, drive shaft 9 is of a stepped configuration defined by a reduced diameter cylindrical end portion 23 extending outwardly from a larger diameter cylindrical base portion 25. The difference in diameters between portions 23 and 25 forms a transverse annular surface 27 therebetween. Drive pulley is preferably mounted on base portion 25 of shaft 9 and provided with a lower planar surface 29 that is disposed in a substantially coplanar relationship with annular surface 27. Housing 7 includes an annular cavity 31 defined by a downwardly extending cylindrical flange 33 and an inwardly extending circular flange 35.

Mounting assembly 1 includes a cylindrical sleeve 37 provided with an annular lateral flange 39 at its upper end. Flange 39 includes a plurality of circumferentially spaced studs 41 extending outwardly therefrom. The lower end of sleeve 37 terminates in a bottom wall 43 provided with a centrally disposed aperture 45 therethrough. Sleeve 37 defines a cylindrical interior cavity 47 which extends from the upper surface of flange 39 down to the upper surface of bottom wall 43. Sleeve 37 is inserted within a correspondingly sized cylindrical flange 48 of impeller 5 and secured thereto by a fastener 49 having an enlarged head 51 and a threaded shank 53. Head 51 is retained within cavity 47 while shank 53 extends through aperture 45 and is engaged within a threaded central passageway 55 formed in impeller 5.

Figure 3:
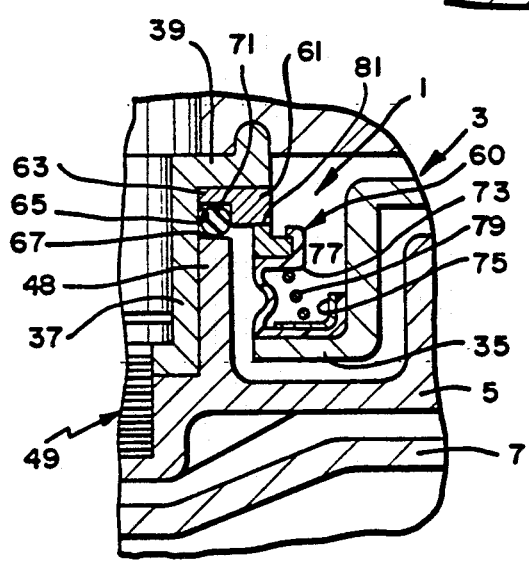
FIG. 3 is a partial cross-sectional view on an enlarged scale and showing the mounting assembly of FIG. 1.

Sleeve 37 is mounted on drive shaft 9 by disposing end portion 23 within cavity 47 so that the upper surface of flange 39 engages coplanar surfaces 27 and 29, and studs 41 are engaged within a plurality of corresponding recesses 57 formed in surface 29. It is therefore apparent that the keyed engagement of studs 41 in recesses 57 permits the joint rotation of sleeve 37 and impeller 5 by shaft 9. It should further be noted that end portion 23 is of substantially the same diameter as cavity 47 but terminates short of end wall 43 so that a clearance 59 is defined between portion 23 and fastener 49 when end portion 23 is fully inserted within cavity 47. Thus, there is no direct connection of impeller 5 to drive shaft 9. However, the slidable keyed engagement of sleeve 37 on drive shaft 9 in this manner requires a provision for applying an end thrust force to impeller 5 in order to axially locate and maintain same on end portion 23 of shaft 9. This is accomplished by additional features of assembly 1 which shall hereinafter be detailed with particular reference to FIG. 3.

Mounting assembly 1 also includes a sealing assembly 60 comprising an annular counter ring 61 disposed in engagement against the lower surface of flange 39. Ring 61 is provided with an annular stepped portion 63 which defines a circular cavity 65 with an upper edge 67 of cylindrical flange 48. An O-ring 71 is disposed within cavity 65 to provide a seal between impeller 5 and counter ring 61. A flexible annular boot 73 is disposed on the upper annular surface of flange 35 and provided with an annular retainer 75 at its lower portion and a slide ring 77 at its upper portion. Slide ring 77 is bonded to boot 73 and urged into engagement against counter ring 61 by a coil spring 79 disposed within boot 73 and trapped between retainer 75 and the upper end of boot 73 below ring 77. In this manner, rings 61 and 77 have opposing corresponding faces which are disposed in engagement with each other to define an annular seal interface 81 therebetween. Since housing 7 is stationary, the force imparted by spring 79 therefore urges sleeve 37 and impeller 5 toward shaft 9. Thus, the required end thrust force for axially locating impeller 5 on shaft 9 and maintaing same in position for rotation thereby is realized through spring 79 of sealing assembly 60, the latter serving to prevent fluid from leaking out of housing 3.

Figure 5:
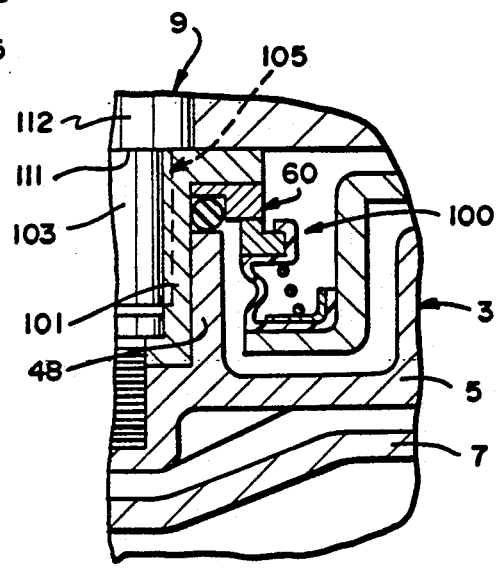
FIG. 5 is partial cross-sectional view on an enlarged scale showing the mounting assembly of FIG. 4.

A second embodiment of the invention shall now be described with particular reference to FIGS. 4 and 5. As shown therein, a mounting assembly 100 is exactly the same in all structural and functional characteristics as assembly 1 of the first embodiment with the exception of the manner in which drive shaft 9 of motor 11 is engaged by a sleeve 101. In this case, drive shaft 9 is provided with an end portion 103 which is disposed in keyed engagement with sleeve 101 by means of a spline and groove connection, shown generally at 105. This engagement may be realized by providing end portion 103 with a plurality of axially extending and circumferentially spaced splines which are received within a corresponding number of axially extending grooves spaced around the interior wall of sleeve 101. Alternatively, the splines may be provided on the interior wall of sleeve 101 and the grooves may be formed on the circumferential surface of end portion 103. Either form of splined engagement is well known in the art and serves to permit sleeve 101 to be rotated by drive shaft 9 during operation of motor 11. As is apparent, this embodiment does not require the outwardly extending studs 41 carried by sleeve 37 and the corresponding recesses 57 formed in drive pulley 17 described for assembly 1 of the first embodiment. Instead, sleeve 101 includes a lateral circular flange 107 which engages a lower surface 109 of a drive pulley 110 and an annular surface 111 defined by a larger diameter base portion 112 of drive shaft 9, with surfaces 109 and 111 being coplanar in the manner of surfaces 27 and 29 of the first embodiment. Thus, except for the manner in which sleeve 101 is disposed in keyed engagement with drive shaft 9, mechanism 100 is also provided with the same seal assembly 60 previously described for assembly 1.

Both embodiments of the invention, assemblies 1 and 100, have been described in conjunction with axially locating impeller 5 on a drive shaft 9 of a stepped configuration defined by base and end portions of different diameters. However, it is understood that the invention may also be advantageously utilized with motors having drive shafts of uniform diameters. It is further understood that mounting assembly 100 of the second embodiment is particularly useful in those situations where a drive pulley is not provided on the drive shaft since the keyed engagement between the sleeve and the drive shaft is of a splined configuration.

Sleeves 37 and 101 are preferably formed of metal or any other material deemed suitable for the practice of the invention as described herein. Housing 7 and impeller 5 are preferably formed from an appropriate thermoplastic material, such as polypropylene. Counter ring 61 is formed from an appropriate ceramic material, such as sintered or pressed aluminum oxide or burnt silicon dioxide. Slide ring 77 is formed of an appropriate plastic material, such as carbon graphite. Boot 73 is formed of an appropriate elastomeric material, such as Neoprene.

It is to be understood that the forms and configurations of the invention herein shown and described are to be taken as preferred examples or embodiments thereof, and that various changes in shape, material, size and arrangement of parts may be resorted to without departing from the spirit of the invention or scope of the subjoined claims.

I claim:

1. An assembly for mounting the impeller of a fluid pump to the drive shaft of an electric motor, the pump being of the type including an impeller disposed for rotation within a stationary housing for pressurizing fluid through an inlet and an outlet of the housing and a resilient seal assembly for preventing fluid leakage from the housing, the improvement comprising the resilient seal assembly being disposed to urge the impeller in a direction towards the drive shaft of the motor for providing end thrust force to axially locate and maintain the impeller on the drive shaft, a sleeve slidably secured on the end of the drive shaft, the impeller being attached to the sleeve and the seal assembly being disposed between the sleeve and the housing.

2. The assembly of claim 1 wherein the sleeve further includes means forming a keyed engagement between the sleeve and the drive shaft, a lateral flange provided at one end of the sleeve, the housing including a circular flange, the seal assembly being disposed between and in engagement with the lateral and circular flanges for urging same in opposite directions, and the impeller being secured to the other end of the sleeve.

3. The assembly of claim 2 wherein the seal assembly includes a counter ring in engagement with the lateral flange, an elastomeric boot carried by the circular flange, a slide ring secured to the boot, and a spring means disposed within the boot for urging the slide ring against the counter ring to define a seal interface therebetween.

4. The assembly of claim 3 wherein the impeller includes a cylindrical flange surrounding the sleeve, the cylindrical flange including a circular edge, the counter ring includes an annular stepped portion, the circular edge, sleeve and annular stepped portion collectively defining a circular cavity, and sealing means disposed in the circular cavity and engaged by the counter ring and impeller to provide a fluid seal therebetween.

5. The assembly of claim 2 wherein the other end of the sleeve includes a bottom wall, a central aperture formed in the bottom wall, and a fastener disposed through the aperture for securing the impeller to the sleeve.

6. The assembly of claim 5 wherein when the sleeve is fully secured on the drive shaft, a clearance is defined between the drive shaft and the fastener.

7. The assembly of claim 2 wherein the keyed engagement means includes a plurality of studs extending outwardly from the lateral flange for engagement within a plurality of corresponding recesses provided in a drive pulley attached to the drive shaft.

8. The assembly of claim 2 wherein the keyed engagement means includes a spline and groove engagement between the exterior wall of the drive shaft and the interior wall of the sleeve.

9. A motor and pump assembly for an automatic clothes washing machine comprising:
   (a) an electric motor including a drive shaft;
   (b) a pump including a stationary housing having an inlet and an outlet, and a rotatable impeller disposed within the housing for pressurizing water through the inlet and the outlet; and
   (c) means for mounting the impeller to the drive shaft including a resilient seal assembly for preventing leakage of fluid from the housing and disposed to urge the impeller towards the drive shaft for providing end thrust force to axially locate and maintain the impeller on the drive shaft, wherein the mounting means includes a sleeve slidably secured on the end of the drive shaft, the impeller being attached to the sleeve and the seal assembly being disposed between the sleeve and the housing.

10. The assembly of claim 9 wherein the sleeve further includes means forming a keyed engagement between the sleeve and the drive shaft, a lateral flange provided at one end of the sleeve, the housing including a circular flange, the seal assembly being disposed between and in engagement with the lateral and circular flanges for urging same in opposite directions, and the impeller being secured to the other end of the sleeve.

11. The assembly of claim 10 wherein the seal assembly includes a counter ring in engagement with the lateral flange, an elastomeric boot carried by the circular flange, a slide ring secured to the boot, and a spring means disposed within the boot for urging the slide ring against the counter ring to define a seal interface therebetween.

12. The assembly of claim 11 wherein the impeller includes a cylindrical flange surrounding the sleeve, the cylindrical flange including a circular edge, the counter ring includes an annular stepped portion, the circular edge, sleeve and annular stepped portion collectively defining a circular cavity, and sealing means disposed in the circular cavity and engaged by the counter ring and impeller to provide a fluid seal therebetween.

13. The assembly of claim 10 wherein the other end of the sleeve includes a bottom wall, a central aperture formed in the bottom wall, and a fastener disposed through the aperture for securing the impeller to the sleeve.

14. The assembly of claim 13 wherein when the sleeve is fully secured on the drive shaft, a clearance is defined between the drive shaft and the fastener.

15. The assembly of claim 10 further including a drive pulley attached to the drive shaft, a plurality of recesses formed in the drive pulley, and the keyed engagement includes a plurality of studs extending outwardly from the lateral flange and disposed in engagement within the recesses.

16. The assembly of claim 10 wherein the keyed engagement means includes a spline and groove engagement between the exterior wall of the drive shaft and the interior wall of the sleeve.

* * * * *